May 16, 1950     C. W. MacMILLAN     2,507,988
ENGINE FUEL CONTROLLING DEVICE
Filed Oct. 9, 1945     3 Sheets-Sheet 1
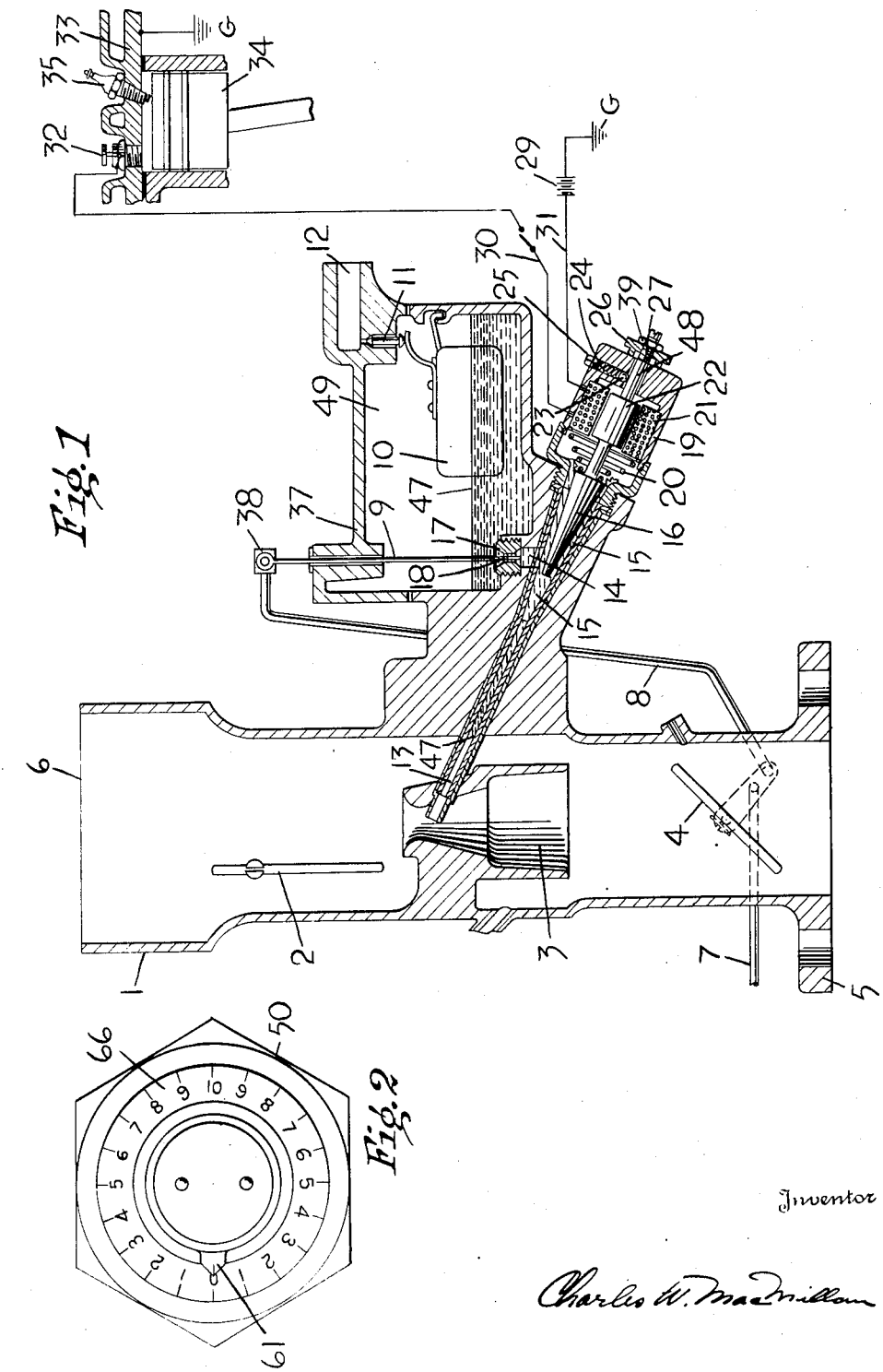
Inventor
Charles W. MacMillan May 16, 1950 C. W. MacMILLAN 2,507,988
ENGINE FUEL CONTROLLING DEVICE
Filed Oct. 9, 1945 3 Sheets-Sheet 2
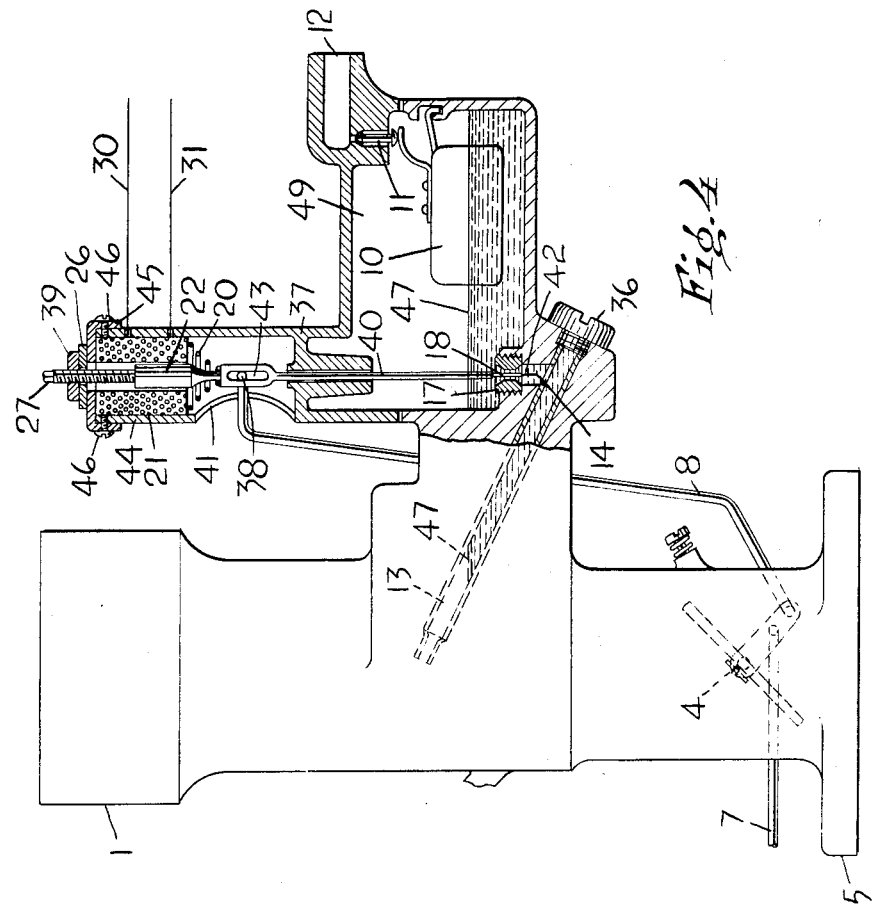
Inventor
Charles W. MacMillan Patented May 16, 1950

2,507,988

UNITED STATES PATENT OFFICE 2,507,988

ENGINE FUEL CONTROLLING DEVICE

Charles W. MacMillan, Pompano, Fla.

Application October 9, 1945, Serial No. 621,309

8 Claims. (Cl. 123—119)

This invention relates to internal combustion engines and particularly to automatic means for controlling the flow of fuel through the carburetor.

Detonation in internal combustion engines results from imperfect relation between cylinder compression pressure, fuel characteristics, ignition timing, power output, and air-fuel ratio. During operation of any particular engine, the characteristics of the fuel being used cannot be altered. Furthermore, the compression ratio of any engine is a fixed design feature which may not be readily altered. Therefore, in order to provide the optimum relationship between all of the factors mentioned above and under all conditions of engine operation, it is necessary to adjust either the ignition timing or the air-fuel ratio, or both, in accordance with the load imposed upon the engine.

The matter of automatically adjusting ignition timing to avoid detonation has been separately covered in my Patent No. 2,394,792, Feb. 12, 1946, for an Engine ignition controlling device.

It is known that a "lean" mixture delivered to the cylinders of an internal combustion engine produces detonation more readily than a "rich" mixture, other conditions being equal. Thus, when a sudden demand for high power output is imposed upon an engine (such as during take-off of an airplane, or climbing a steep grade in an automobile) it is desirable to increase the "richness" of the fuel mixture temporarily to prevent detonation and obtain full power.

The primary object of the device disclosed herein is to provide means for automatically adjusting the flow of fuel from the carburetor into the combustion chamber of an engine to the end that the mixture of fuel and air is regulated to prevent detonation and secure optimum economy and power output.

Another object is to provide an improvement in carburetors wherein control of the metering of fuel is made a function of engine combustion chamber pressure as well as a function of throttle valve opening.

Another object is to provide a combination of elements which when incorporated in an engine assembly will act instantaneously to increase the "richness" or amount of fuel in the air-fuel mixture when detonation occurs or tends to occur.

Another object is to provide a combination of elements to the end that both the metering of fuel through the carburetor and the adjustment of ignition timing (the latter as set forth in my Patent No. 2,394,792, Feb. 12, 1946) are effected simultaneously as a function of combustion chamber pressure, thus contributing their combined effect to preclude detonation.

Still another object is to provide an electrical solenoid in connection with a carburetor for the purpose of automatically increasing the flow of metered fuel when detonation occurs or tends to occur.

Another object is to make use of a pressure responsive unit which may be contained in the cylinder head of an engine, such as described in my Patent No. 2,394,792, Feb. 12, 1946, previously referred to herein, whereby detonating pressures within the combustion chamber of the engine cause the closing of an electrical circuit which in turn actuates solenoids incorporated respectively in the ignition distributor and the carburetor to the end that their combined action provides maximum use of these mechanically adjustable features for avoiding detonation.

Other objects and advantages of this device will become apparent from the following description.

In the drawings,

Figure 1 illustrates in cross section the principal parts of a conventional carburetor incorporating an adaptation of the device including the basic electrical circuit communicating with a pressure responsive unit contained in the engine cylinder head;

Figures 2 and 3 illustrate a plan view and sectional elevation of a design of the pressure responsive unit which is the same as the unit illustrated in Figures 1 and 2 of my Patent No. 2,394,792, Feb. 12, 1946, and fully described therein;

Figure 4 illustrates, in partial section, an alternative adaptation of the device as incorporated in a conventional type of carburetor;

Figure 5:
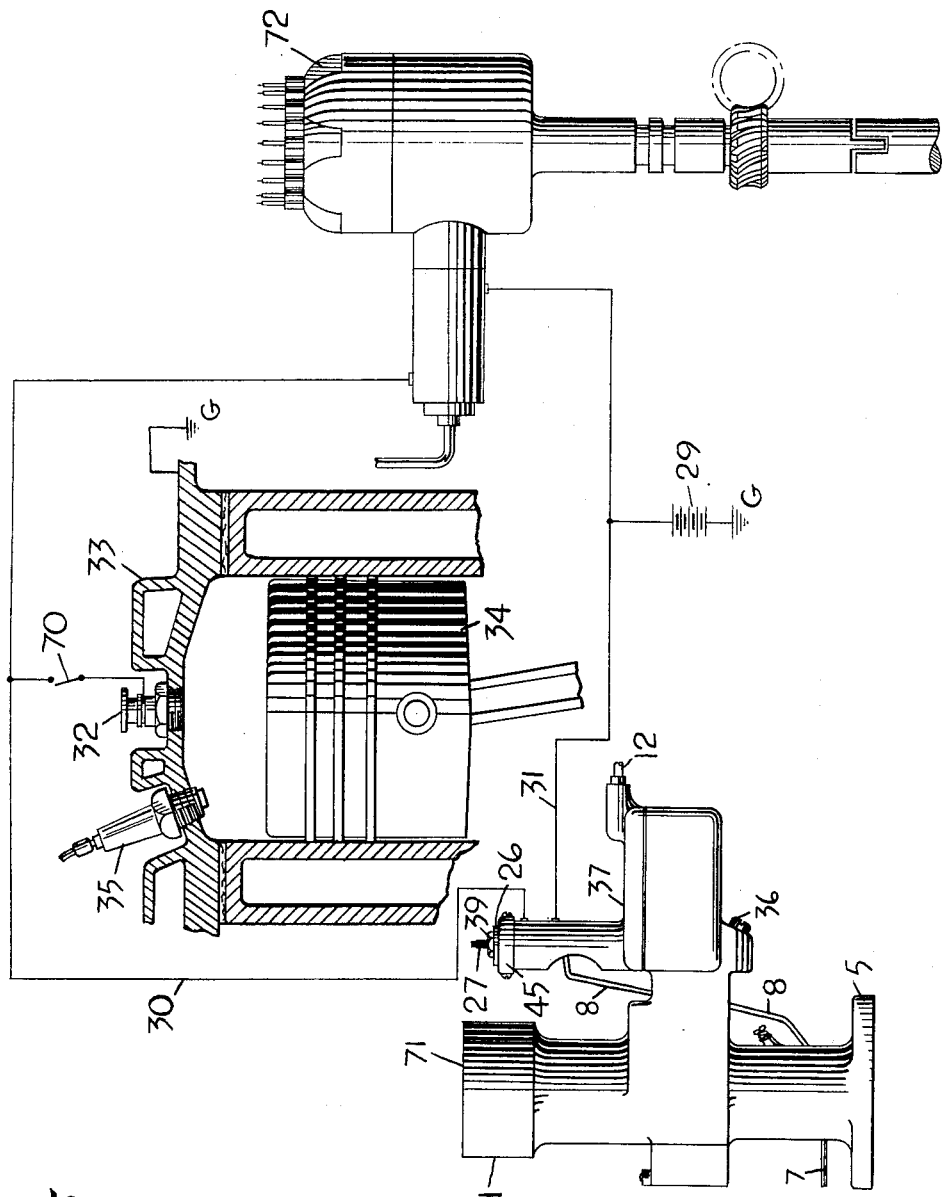
Figure 5 illustrates schematically the device as it may be combined with the engine ignition controlling device covered in my Patent No. 2,394,792, Feb. 12, 1946, referred to above.

A detailed description follows.

In Figure 1 the housing 1 of the air conducting portion of the carburetor contains as principal parts a choke valve 2, Venturi throats 3, throttle valve 4, base flange 5, air intake opening 6, and main fuel nozzle 13. Carburetor float 10 is housed in casing 37 together with fuel inlet valve 11 and inlet passage 12. Metering rod 9 is connected with actuating link 8 at 38. The lower end of metering rod 9 is provided with a plurality of stepped diameters 18 which control the flow of fuel through orifice 17. Normal fuel level supporting float 10 and in nozzle 13 is indicated by 47. Throttle rod 7 communicates with and actuates throttle valve 4 in a conventional manner.

Continuing the detailed description of Figure 1, an electric solenoid 21, housed in casing 19, contains slidable armature or plunger 22 which embodies a tapered plunger length 16 toward one end, and a threaded portion 27 fitted with adjusting nut 26 and lock nut 39 at the other end. A spring 20 holds armature 22 in a fixed position when the latter is not actuated by the solenoid. A ball 23 exerts pressure against shaft 48 by means of spring 24 and screw 25. Passage 14 provides for flow of fuel from float chamber 49 to nozzle 13. Passage 15 is tapered to match the taper of plunger 16 movably contained therein. Solenoid lead wire 31 is connected to current source 29 and thence to an electrical ground G. Lead wire 30 is connected through an optional switch to the pressure responsive unit 32, the latter being connected to the electrical ground thus completing the series circuit for operating the solenoid. An engine piston 34, cylinder head 33, and spark plug 35 are shown schematically in reduced proportion to illustrate their connection with the device. It is contemplated that the pressure responsive unit 32 and spark plug 35 may be advantageously combined into a single unit, and it should be specifically understood that any such combined design is included in the concept of the complete device as disclosed herein.

In Figures 2 and 3 a threaded body 50 is supported by engine cylinder head 65 and sealed against leakage by gasket 64. Flexible diaphragm 52, containing corrugations 53 also contains an integral electrical contact surface 55 on one side and is held in body 50 by a threaded cup shaped piece 51. Adjustable screw 63 having electrical contact surface 54 at one end is fitted to tapped bushing 57 and is electrically insulated from piece 51 by split insulating bushing 58. Screw 63 terminates at one end in knurled head 62 to which is fitted pointer 61 for indication of its angular position with reference to marked circular scale 66. Spring 56 exerts pressure against the inner side of diaphragm 52. Spring 60 exerts pressure on the lower side of head 62 for purposes of friction. Electrical lead wire 30 makes electrical connection with screw 63 through terminal washer 59 and lock nut 68. Combustion chamber gases exert pressure on one side of diaphragm 52 as indicated by arrows 69.

In Figure 4 an alternative arrangement of the device as applied to a carburetor is shown wherein solenoid 21 and slidable armature 22 are assembled with metering rod 40 attached to said armature. An elongated slot 43 in the upper extremity of metering rod 40 permits movement of this rod upward when acted upon by the solenoid without interference from actuating rod 8 which is also connected through opening 41 to metering rod 40 at 38. In the arrangement of Figure 4, metering rod 40 is provided with an additional calibrated diameter 42 at its extremity for metering fuel through passage 14 and thence to nozzle 13 which is sealed from the atmosphere by screw plug 36. An extension 44 of housing 37 provides a protected location for solenoid 21. An annular cap 45 is held on housing extension 44 by screws 46. Adjusting nut 26 and lock nut 39 fit threaded end 27 of armature 22 permitting adjustment of metering rod 40.

In Figure 5 carburetor assembly 71 and pressure responsive unit 32 are illustrated in a combined electrical circuit with a distributor unit 72. The distributor unit illustrated and previously mentioned herein is fully described in my Patent No. 2,394,792, Feb. 12, 1946. In the combination of Figure 5 a preferred embodiment of the solenoid as applied to the carburetor is shown, although other arrangements within the concept of the device disclosed are considered permissible and reserved under this document. A switch 70 is illustrated schematically in Figure 5 as a convenient means of disconnecting the circuit, and same would preferably be incorporated with the engine ignition switch.

A description of both individual and combined operation of the carburetor and distributor elements follows. When detonation tends to occur in the combustion chamber the maximum pressure therein is considerably increased, and although of momentary duration its effect is sufficient to cause mechanical movement of the diaphragm 52 in excess of the movement caused by normal operating pressures which impinge against it as illustrated by 69 in Figure 3 of the drawings. The excess movement of the diaphragm 52 causes contacts 54 and 55 to close with the result that current flows from the source 29 through conductors 39 and 31 to energize the carburetor solenoid 21. This results in movement of the plunger 16 as shown in Figure 1, or the metering rod 40 as shown in Figure 4 to reduce the restriction to flow of fuel through orifice 17 and nozzle 13. The immediate reduction of this restriction produces an immediate increase in the quantity of fuel entering the engine through carburetor jet 13. This increase in fuel not being accompanied by a corresponding increase in air intake results in enrichment of the air-fuel mixture. It is well known that such enrichment of mixture produces a decreased tendency of an engine to "knock" or in other words it permits operation of the engine under a load which would otherwise cause detonation.

Since enrichment of the fuel mixture alone may not be sufficient to preclude detonation under certain conditions of engine operation, an additional means of reducing the tendency of the engine to "knock" is provided in the form of a solenoid-adjusted ignition distributor or magneto. In this element the solenoid is caused to operate as an identical result of detonating pressure in the cylinder combustion chamber as that described above in connection with the solenoid operated carburetor. However, the distributor solenoid (as described and shown in detail in Patent No. 2,394,792, Feb. 12, 1946, C. W. MacMillan) functions to produce movement of the spark timing element of the distributor so as to retard the latter independently of other spark timing linkages. It is well known that to reduce the degree of forward advancement of the spark setting has the effect of decreasing the tendency of an engine to "knock." Thus, the use of both spark retarding means and fuel enrichment means connected in the same circuit and actuated from a common detonation responsive source inserted in the cylinder head provides a combination which is doubly effective in comparison to the use of either the solenoid operated carburetor or solenoid operated distributor individually.

In operation it is evident in Figure 3 that the contact points 54 and 55 will close when sufficient combustion gas pressure exists in the engine cylinder. Detonation pressures may range from 50% to several times the normal maximum pressure. The unit of Figure 3 is so adjusted to respond to detonation pressures. Closing of contacts 54 and 55 causes current to flow (see Figure 1) from battery 29 through conductors 30 and 31 and solenoid winding 21. The magnetic action of the solenoid causes armature 22 to slide outwardly thus decreasing the obstruction in passage 15 and allowing an increase in fuel to flow. The resultant enrichment of the air-fuel mixture entering the engine results in decreasing or eliminating the attendant detonation.

The arrangement of Figure 4 is functionally the same as described above, the difference being the use of the metering rod 40 to cause increased flow and an enriched mixture when detonation occurs. In this application (Figure 4) current passing through solenoid 21 causes armature 22 to slide outwardly, thus withdrawing the stepped end 18 of metering rod 40 from orifice 17, thus allowing an increase in the flow of fuel.

It is evident that the combination of this device with a solenoid operated distributor as illustrated in Figure 5 would provide dual automatic means for controlling detonation. In this combination the action of each device is cumulative. It is obvious that either the solenoid operated carburetor or the solenoid operated distributor may be used singly or in multiples or may be combined as conditions and the particular designs of engines may require.

I claim:

1. In detonation controlling systems adapted to internal combustion engines, a carburetor, electric solenoid means integral with said carburetor for adjusting the fuel orifice opening communicating with the engine manifold and cylinders, said solenoid being arranged to produce metering control of fuel flow from said carburetor in response to an electric current which flows thru the solenoid coil in response to predetermined effects produced by said engine.

2. In detonation controlling systems adapted to internal combustion engines, a carburetor comprising a fuel reservoir chamber, a float and float valve, main jet, by pass jet, Venturi throat, choke and throttle valves, and an electric solenoid having a movable plunger, said plunger being connected to a metering valve in said carburetor.

3. In detonation controlling systems adapted to internal combustion engines, a carburetor comprising a fuel reservoir chamber, a float and float valve, main jet, by pass jet, Venturi throat, choke and throttle valves, metering rod, and an electric solenoid having a plunger connected to said metering rod, manual means for operating said rod, and means permitting operation of said rod as a result of electric current flow thru said solenoid in response to predetermined effects produced by said engine.

4. In internal combustion engines, a carburetor comprising means for atomzing fuel and manual control of the flow of said fuel an electric solenoid, said solenoid having a movable armature, a fuel metering valve and means operably connecting said manual control and said armature with said valve.

5. In internal combustion engines, a carburetor comprising means for passing atomized fuel into the cylinders of said engines, manual control of the flow of said fuel, a fuel metering valve, an electric solenoid, and means operably connecting said manual control and said electric solenoid with said valve.

6. In internal combustion engines, a carburetor comprising means for passing atomized fuel into the engine cylinders, means for manual control of the flow of said fuel, a fuel metering valve, an electric solenoid and means operably connecting said manual control means and said electric solenoid with said valve, an electric circuit connecting said solenoid with a pressure responsive switch, said switch being disposed for operation as a result of predetermined cylinder pressure.

7. In internal combustion engines, a carburetor comprising means for passing atomized fuel into the engine cylinders, means for manual control of the flow of said fuel, a fuel metering valve, an electric solenoid and means operably connecting said manual control means and said electric solenoid with said valve, an electric circuit connecting said solenoid with a pressure responsive unit, said unit being disposed to control the flow of current thru said solenoid as a result of selected effects produced by said engine.

8. In a carburetor, a valve arranged to control the flow of fuel thru the main jet thereof, said valve being located concentrically with the orifice of said carburetor communicating with said main jet, said valve and said orifice being elongated and relatively tapered, an electric solenoid integral with said carburetor, and connecting means between the armature of said solenoid and said valve, and means for movement of said armature and said valve to the end that said orifice is enlarged or reduced in effective cross-sectional area in response to the flow of current thru said solenoid.

CHARLES W. MACMILLAN.

REFERENCES CITED

The following references are of record in the file of this patent:

UNITED STATES PATENTS

| Number | Name | Date |
|---|---|---|
| 2,220,558 | Van Dijck et al. | Nov. 5, 1940 |
| 2,401,563 | Hersey | June 4, 1946 |
| 2,407,652 | Costa | Sept. 17, 1946 |